United States Patent
Thomas

(10) Patent No.: US 10,079,481 B2
(45) Date of Patent: Sep. 18, 2018

(54) WEATHERPROOF ELECTRICAL BOX ASSEMBLY

(71) Applicant: Hubbell Incorporated, Shelton, CT (US)

(72) Inventor: Jason Peter Thomas, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/231,870

(22) Filed: Aug. 9, 2016

(65) Prior Publication Data

US 2017/0047717 A1    Feb. 16, 2017

Related U.S. Application Data

(60) Provisional application No. 62/204,886, filed on Aug. 13, 2015.

(51) Int. Cl.
*H02G 3/08* (2006.01)
*H02G 3/14* (2006.01)

(52) U.S. Cl.
CPC ............. *H02G 3/088* (2013.01); *H02G 3/14* (2013.01)

(58) Field of Classification Search
CPC .......... H02G 3/088; H02G 3/086; H02G 3/08; H02G 3/00; H02G 3/14
USPC ................................ 220/3.92, 3.94, 3.3, 3.2
See application file for complete search history.

(56) References Cited

U.S. PATENT DOCUMENTS

| 4,605,816 | A | | 8/1986 | Jorgensen et al. | |
|---|---|---|---|---|---|
| 5,789,706 | A | * | 8/1998 | Perkins | H02G 3/0691 174/135 |
| 6,956,169 | B1 | * | 10/2005 | Shotey | H02G 3/121 174/50 |
| 7,479,598 | B1 | * | 1/2009 | Shotey | H02G 3/14 174/135 |
| 7,855,338 | B2 | | 12/2010 | Troder | |
| 8,779,288 | B1 | | 7/2014 | Baldwin | |
| 2003/0029105 | A1 | * | 2/2003 | Jurvis | E04F 17/08 52/233 |
| 2003/0089710 | A1 | * | 5/2003 | Gates, II | H01R 25/006 220/3.92 |

OTHER PUBLICATIONS

International Search Report and Written Opinion mailed in corresponding PCT Application PCT/US2016/046115 dated Oct. 21, 2016 (10 pages).

* cited by examiner

*Primary Examiner* — Steven A. Reynolds
*Assistant Examiner* — Javier A Pagan
(74) *Attorney, Agent, or Firm* — Wissing Miller LLP

(57) ABSTRACT

An electrical box assembly is provided. The electrical box assembly includes a mounting sleeve capable of being secured to a wall and configured to support an electrical device, a cover base configured to be inserted into and secured to the mounting sleeve, an adapter plate configured to be secured to the cover base, and a cover lid pivotably secured to the cover base.

24 Claims, 6 Drawing Sheets

WEATHERPROOF ELECTRICAL BOX ASSEMBLY

CROSS REFERENCE TO RELATED APPLICATIONS

The present disclosure is based on and claims benefit from U.S. Provisional Application Ser. No. 62/204,886 filed Aug. 13, 2015 entitled "Weatherproof Electrical Box Assembly," the entire contents of which are herein incorporated by reference.

BACKGROUND

Field

The present disclosure relates generally to the field of weatherproof electrical boxes for electrical devices, such as receptacles, and more particularly, to weatherproof electrical box assemblies that permit an electrical device to be recessed within the box and minimize the outward profile of the weatherproof box cover.

Description of the Related Art

Electrical boxes are mounted in various locations and positions depending on the particular application. Electrical boxes that are mounted outside and exposed to the weather require suitable shielding to protect the electrical device and electrical plugs and cords from the weather and particularly rain. Therefore, electrical outlet boxes mounted outside typically have one or more covers to close around the electrical device and the electrical cords.

Although building codes may vary between areas, most codes require the cover to be self-closing so that cover will automatically close around the electrical device when released. The cover is either spring biased or gravity operated. Gravity operated covers are often preferred since they eliminate additional parts and springs and are less likely to malfunction. Gravity operated covers require the hinge to be located along a top portion of the body or mounting face plate of the cover so that the cover pivots downwardly to a closed position by the weight of the cover.

Current weatherproof covers used to protect electrical devices and electrical cords typically have a large exterior profile, in the range of 3 inches to 4 inches, in order to cover a plug of the electrical cord while it is plugged into the electrical device. As a result, electrical devices on an exterior wall of a residence or commercial building have an aesthetically displeasing cover extending from the exterior wall surface about 3-4 inches if the electrical box is recessed, or in excess of 4 inches if the electrical box is surface mounted.

SUMMARY

The present disclosure relates to weatherproof electrical box assemblies that permit an electrical device and plug inserted into the electrical device to be recessed within the electrical box assembly to minimize the outward profile of a weatherproof cover lid. In one embodiment, the electrical box assembly includes a mounting sleeve, an adapter plate, a cover base, and a cover lid. The mounting sleeve is capable of being secured to a wall and is configured to support an electrical device. The cover base is configured to be inserted into and secured to the mounting sleeve. The adapter plate is configured to be secured to the cover base and to fit around an electrical device secured within the mounting sleeve, such that when the cover base is secured to the mounting sleeve the adapter plate and at least a portion of the cover base act as a divider within the mounting sleeve to form an electrical wiring chamber within a rear portion of the mounting sleeve, and a plug chamber in a forward portion of the mounting sleeve. The cover lid is pivotably secured to the cover base.

In another exemplary embodiment, the electrical box assembly includes a mounting sleeve, a cover base, an adapter plate and a cover lid. The mounting sleeve is capable of being secured to a wall and has a cavity configured to receive an electrical device. The mounting sleeve has at least one angled channel within the cavity that directs a fastener inserted into the at least one angled channel toward an exterior of the mounting sleeve to facilitate securing the mounting sleeve to the wall. The cover base is configured to be inserted into and secured to the mounting sleeve. The adapter plate is configured to be secured to the cover base such that when the cover base is secured to the mounting sleeve the adapter plate and at least a portion of the cover base act as a divider within the mounting sleeve to form an electrical wiring chamber within a rear portion of the mounting sleeve and a plug chamber in a forward portion of the mounting sleeve. The cover lid is pivotably secured to the cover base.

In another exemplary embodiment, the electrical box assembly includes a mounting sleeve, a cover base, an adapter plate and a cover lid. The mounting sleeve is capable of being secured to a wall, and includes a flange, a pair of side walls extending from the flange, a top wall extending from the flange and integrally formed into a top portion of the pair of side walls, a bottom wall extending from the flange and integrally formed into a bottom portion of the pair of side walls, and a rear wall. The flange forms an open forward portion of the mounting sleeve and the pair of side walls, top wall, bottom wall and rear wall are integrally formed to form a cavity configured to receive an electrical device. The mounting sleeve also includes at least one angled channel within the cavity that directs a fastener inserted into the at least one angled channel toward an exterior of the mounting sleeve to facilitate securing the mounting sleeve to the wall. The cover base is configured to be inserted into the cavity and secured to the mounting sleeve. The adapter plate is configured to be secured to the cover base such that when the cover base is secured to the mounting sleeve the adapter plate and at least a portion of the cover base act as a divider within the mounting sleeve to form an electrical wiring chamber within a rear portion of the mounting sleeve and a plug chamber in a forward portion of the mounting sleeve. The cover lid is pivotably secured to the cover base.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The present disclosure provides a description of an electrical box assembly with reference to specific exemplary embodiments. The specification and drawings are to be regarded in an illustrative sense rather than a restrictive sense. Various modifications may be made thereto without departing from the spirit and scope as set forth in the following claims.

Figure 1:
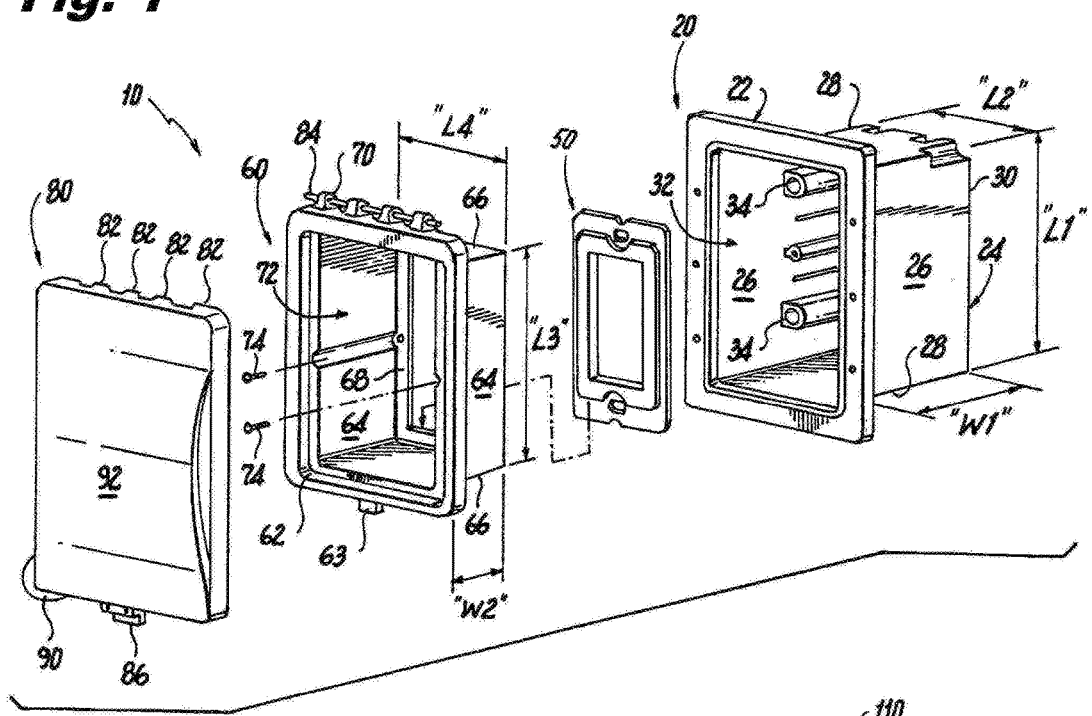
FIG. 1 is a perspective view with parts separated of an electrical box assembly according to the present disclosure, and illustrating a mounting sleeve, an adapter plate, a cover base and a low profile cover lid.
Figure 2:
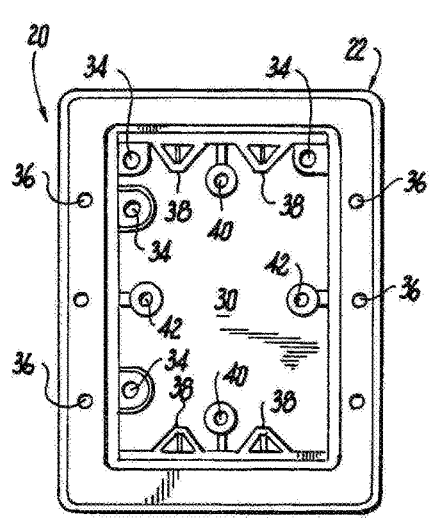
FIG. 2 is a front plan view of the mounting sleeve of FIG. 1, illustrating angled channels on a left side and top of the mounting sleeve for securing the mounting sleeve to a wall stud.
Figure 3:
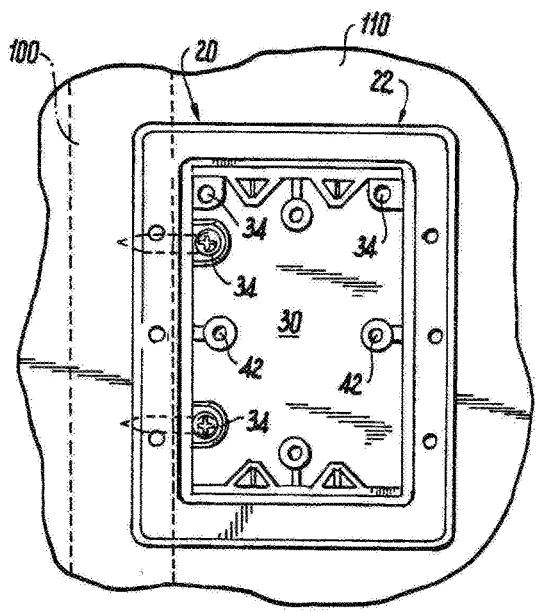
FIG. 3 is a front plan view of the mounting sleeve of FIG. 1 installed in a wall and illustrating angled channels on a left side and top of the mounting sleeve, and screws securing the mounting sleeve to a wall stud in a vertical position.

Referring to FIGS. 1-3, an exemplary embodiment of an electrical box assembly according to the present disclosure is shown. In this exemplary embodiment, the electrical box assembly 10 includes a mounting sleeve 20, an adapter plate 50, a cover base 60, and a cover lid 80. The mounting sleeve, adapter plate, cover base and cover lid can be fabricated from metal, e.g., galvanized steel, or from plastic, e.g., injection molded thermoplastic.

The mounting sleeve 20 has a flange 22 and a housing 24. The flange 22 is attached to or integrally molded into a forward portion of the housing 24. The flange 22 forms a continuous edge around the periphery of the housing 24. The flange 22 is intended to remain outside a mounting hole in a wall, and provides what is known in the art as a finish wall surface, seen in FIG. 10. That is, the flange 22 contacts an outside of a finished wall so the thickness of the finished wall does not affect the mounting of the mounting sleeve 20 to a wall, seen in FIG. 3.

The housing 24 includes side walls 26, top and bottom walls 28 and rear wall 30 closing the back of the housing 24. The housing 24 is configured and dimensioned to receive the cover base 60. For example, the side walls 26 forming the housing 24 can have a length "L1" that can be between about 4 inches and about 5 inches, and a width "W1" that can be between about 3 inches and about 4 inches. The top and bottom walls 28 forming the housing 24 can have a length "L2" that can be between about 2 inches and about 3 inches, and the same width "W1" as the side walls. The rear wall 30 forming the housing 24 can have a length "L1" that is substantially the same as the length of the side walls, and substantially the same width as the length "L2" of the top and bottom walls, which form a sealed housing 24 with a cavity 32, as seen in FIG. 1.

Figure 10:
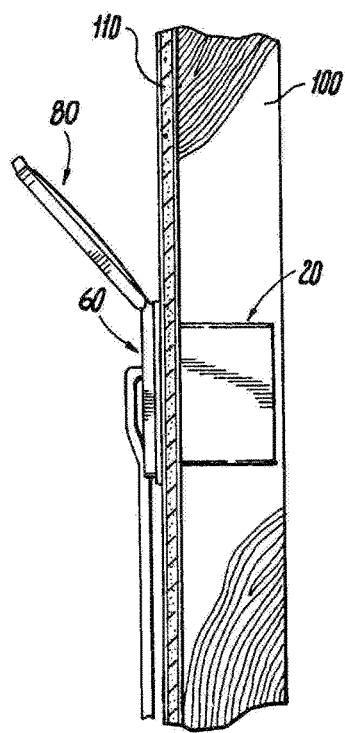
FIG. 10 is a side view of an electrical box assembly of FIG. 1 installed in a wall, and illustrating a cord plugged into an electrical device within the electrical box assembly and low profile cover lid.
Figure 11:
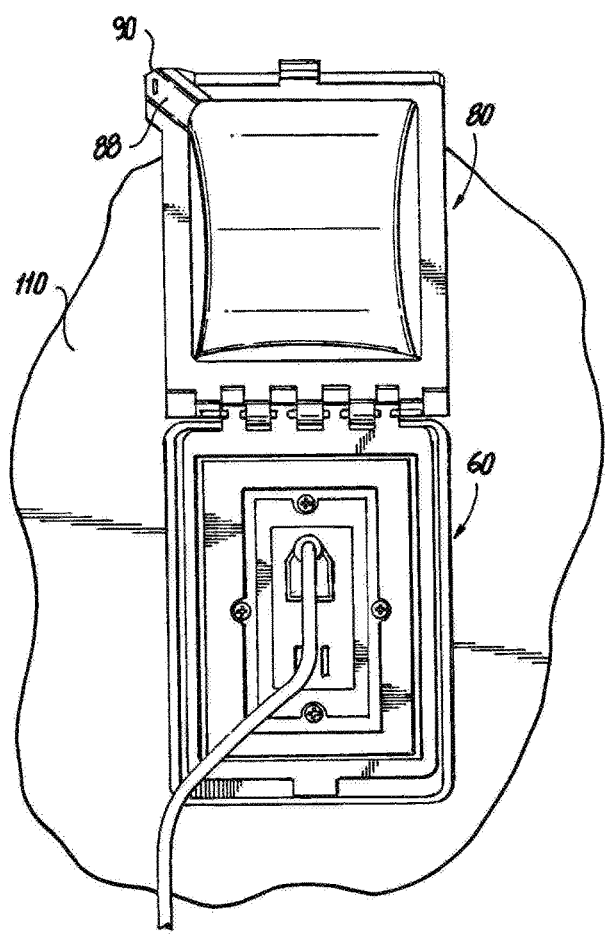
FIG. 11 is a front view of the electrical box assembly of FIG. 10 installed in a wall.

Continuing to refer to FIGS. 1-3, the mounting sleeve 20 can be secured directly to a wall stud 100, or the mounting sleeve 20 can be directly secured to a wall 110 when no wall stud is available. To secure the mounting sleeve 20 to a wall stud 100, one or both side walls 26 of the housing 24 can include a set of angled channels 34, where, for example, screws or nails can be inserted through the angled channels 34 and secured to the wall stud 100. The mounting sleeve 20 can be mounted to a wall stud 100 in a vertical position, as seen in FIGS. 3 and 10, or the mounting sleeve 20 can be mounted to a wall stud 100 in a horizontal position (not shown) using the angled channels 34 in the top or bottom of the mounting sleeve 20, seen in FIGS. 2 and 3. To secure the mounting sleeve 20 directly to a wall 110 when no wall stud is available, one or more dimples 36 on the flange 22 can be drilled out such that there are one or more mounting holes through the flange 22. Screws can then be inserted through the mounting holes to directly secure the mounting sleeve 20 to the finished wall 110.

Referring to FIGS. 2 and 3, typically, the rear wall 26 of the housing 24 has one or more openings or knock-outs to receive one or more electrical cables, such as 14/2 Romex cables. As is known in the art, cable clamps 38 (or connectors) can be used to secure the one or more electrical cables to the mounting sleeve 20. An example of a suitable cable clamp is shown and described in U.S. Pat. No. 4,605,816, which is owned by Hubbell, Incorporated, and is incorporated herein in its entirety by reference. The housing 24 also includes one or more device mounting holes 40 for mounting an electrical device within the housing 24. The housing 24 also includes one or more mounting holes 42 used to secure the cover base 60 to the mounting sleeve 20, as described in more detail below.

Figure 6:
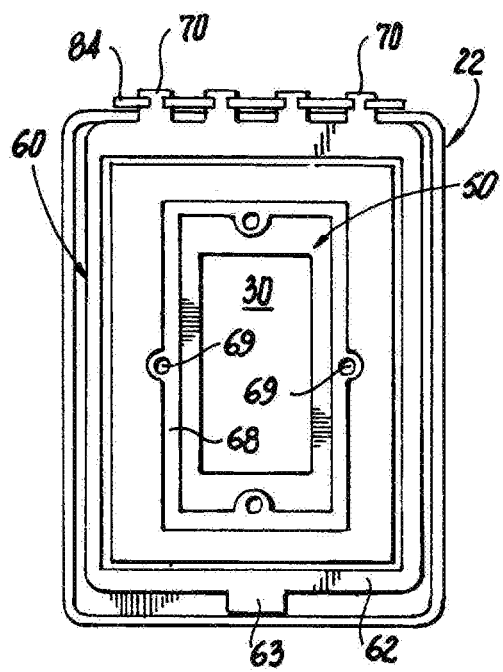
FIG. 6 is a front plan view of a mounting sleeve having an adapter plate and cover base inserted into the mounting sleeve.
Figure 7:
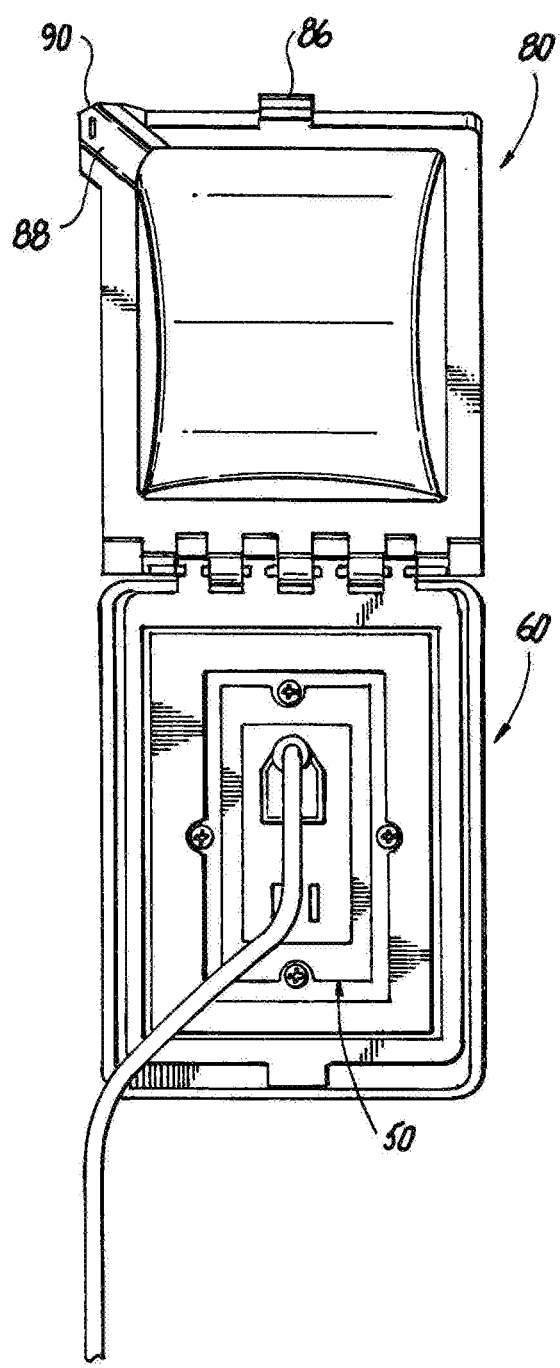
FIG. 7 is a front plan view of an assembled electrical box assembly with the low profile cover lid in an open position and illustrating a cord channel and lift knob.

Referring to FIGS. 1 and 6, the cover base 60 includes a flange 62, a pair of side walls 64, top and bottom walls 66, and rear wall 68 that form a chamber for a plug connected to an electrical cord. The flange 62 is configured to engage flange 22 of mounting sleeve 20 when the electrical box assembly 10 is assembled. The flange 62 forms a continuous edge around the periphery of the cover base 60. The flange 62 includes a plurality of hinge arms 70 that mate with hinge arms 82 on the cover lid 80, as will be described in more detail below. The flange 62 also includes a locking member 63 that interacts with a latching flange 86 on the cover lid 80. The locking member 63 and latching flange 86 form a snap latch assembly.

A weatherproof gasket, such as a rubber or foam gasket, can be attached to or otherwise positioned along an inner surface of the flange 62 so that when the electrical box assembly 10 is assembled, a water tight seal is formed between flange 62 of cover base 60 and an outer surface of flange 22 of mounting sleeve 20. In another embodiment, the weatherproof gasket can be attached to or otherwise positioned along the outer surface of the flange 22 on mounting sleeve 20 so that when the electrical box assembly 10 is assembled, a water tight seal is formed between flange 62 of cover base 60 and an outer surface of flange 22 of mounting sleeve 20.

Figure 4A:
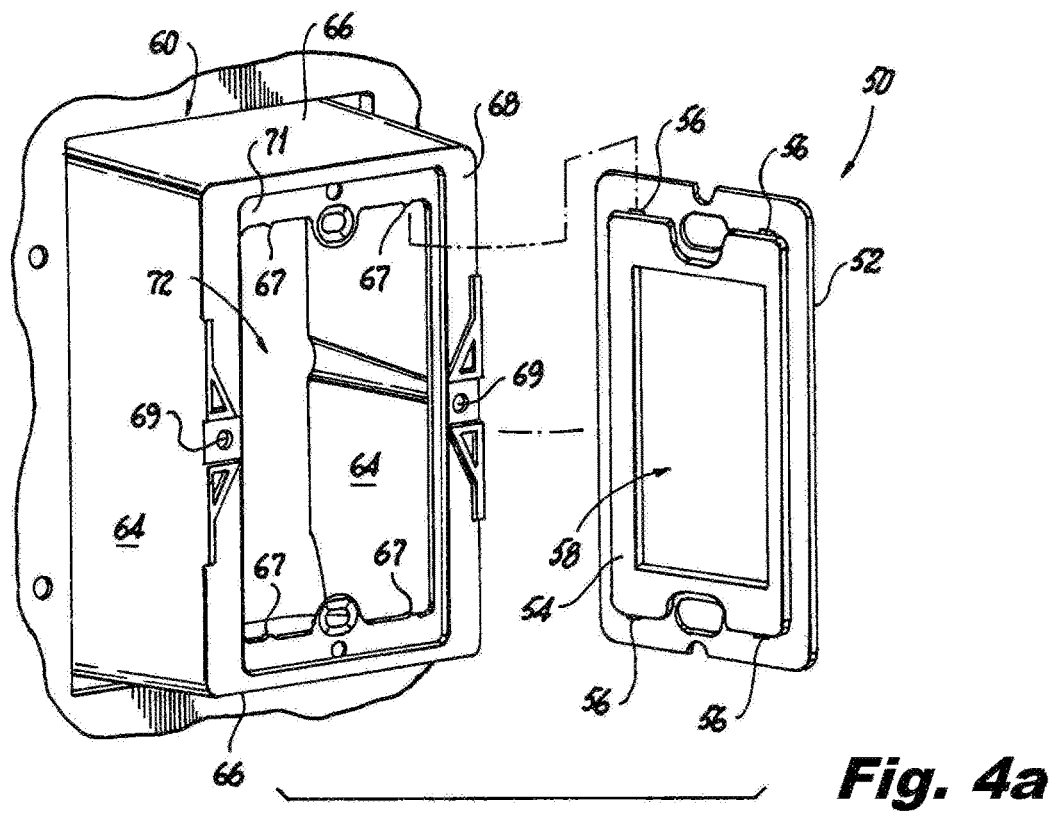
FIG. 4a is a rear perspective view of the cover base and adapter plate of FIG. 1, illustrating the adapter plate separated from the cover base.
Figure 4B:
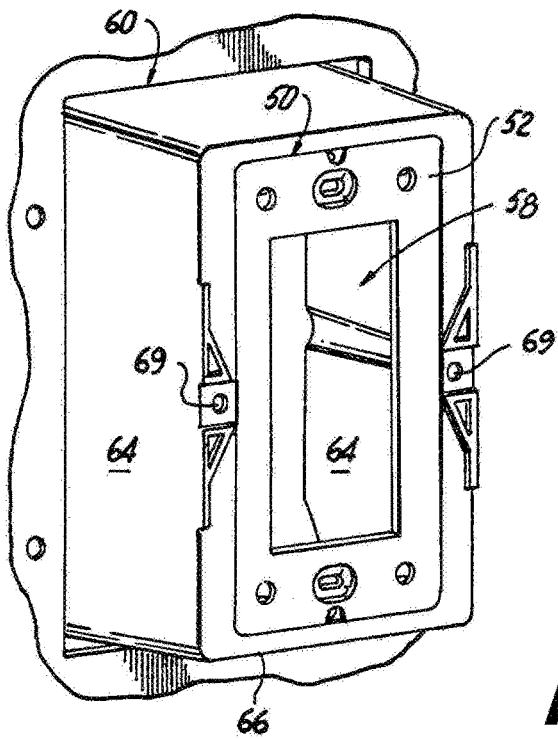
FIG. 4b is a rear perspective view of the cover base and adapter plate of FIG. 4a, illustrating the adapter plate attached to the cover base.

Continuing to refer to FIGS. 1 and 6, the side walls 64, top and bottom walls 66 and the rear wall 68 are configured and dimensioned to fit at least partially within the mounting sleeve 20. For example, the side walls 64 can have a length "L3" that can be between about 4 inches and about 5 inches, and a width "W2" that can be between about 2 inches and about 3 inches. The top and bottom walls 66 can have a length "L4" that can be between about 2 inches and about 3 inches, and the same width "W2" as the side walls 64. The rear wall 68 can have a length "L3" that is the same as the length of the side walls, and the same width "W2" as the side walls. The rear wall 68 has an opening 72 where the adapter plate 50 is attached to the cover base 60, as seen in FIGS. 4a and 4b. The rear wall 68 of the cover base 60 has a pair of mounting holes 69 that align with mounting holes 40 and 42, seen in FIGS. 2 and 3, in mounting sleeve 20 when the cover base is installed within the mounting sleeve 20, and permit the cover base 60 to be secured to the mounting sleeve 20 via screws 74.

Figure 5:
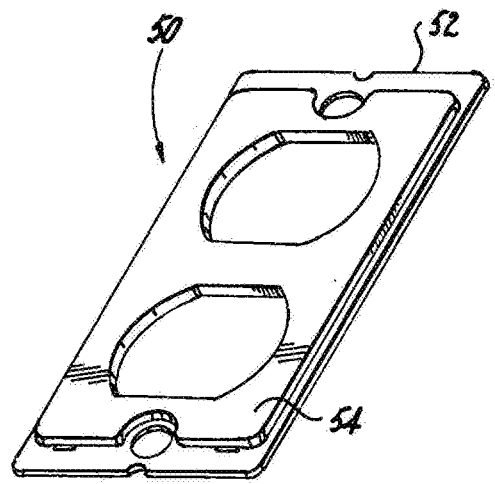
FIG. 5 is a perspective view of another embodiment of an adapter plate that can be used with the electrical box assembly of FIG. 1.

Turning to FIGS. 1, 4a, 4b and 7, an exemplary embodiment of the adapter plate 50 is shown. In this embodiment, the adapter plate 50 is configured and dimensioned to fit within recess 71 and opening 72 in the rear wall 68 of the cover base 60 as noted above. In this exemplary embodiment the adapter plate 50 includes an outer wall 52 and an inner wall 54, where the inner wall 54 fits within opening 72 in the rear wall 68 and the outer wall rests in the recess 71 in the outer wall. The adapter plate 50 preferably snaps into the recess 71 and opening 72. More specifically, in one exemplary embodiment, the top and bottom of the rear wall 68 includes tabs 67, as shown in FIG. 4a, that fit within notches 56 in top and bottom of the adapter plate 50 to releasably secure the adapter plate to the cover base 60. In addition, the adapter plate 50 is configured to fit over an electrical device mounted within the mounting sleeve 20. It is noted that FIG. 4 does not include the electrical device, but FIG. 7 includes an electrical device, such as a GFCI receptacle, and the adapter plate 50 is configured to fit over the GFCI receptacle positioned within the housing 24 of mounting sleeve 20. More specifically, the adapter plate 50 includes a rectangular opening 58 to receive a face portion of the GFCI receptacle. The adapter plate 50 fills gaps between the cover base 60 and an electrical device mounted within the mounting sleeve 20 so that the electrical device is enclosed within an electrical wiring chamber 23 within the mounting sleeve 20, seen in FIG. 9. FIG. 5 shows another embodiment for the adapter plate 50 according to the present disclosure. In this embodiment, the adapter plate 50 is configured and dimensioned to fit over a duplex receptacle mounted within the housing 24 of mounting sleeve 20.

Figure 9:
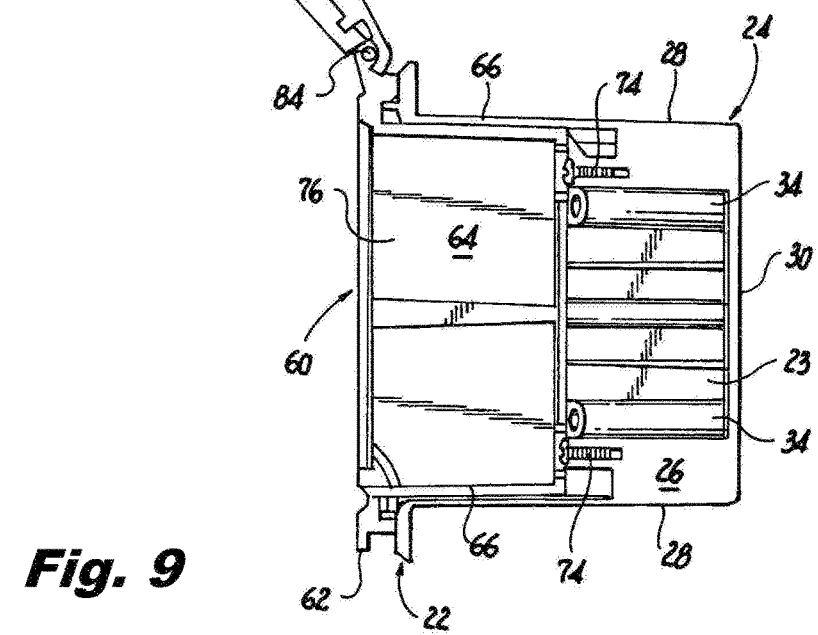
FIG. 9 is a side sectional view of the assembled electrical box assembly of FIG. 8.

When the cover base 60 with the adapter plate 50 releasably secured within the rear wall 68 is inserted into the mounting sleeve 20, the rear wall 68 of the cover base and adapter plate 50 act as a divider to create the closed electrical wiring chamber 23, seen in FIG. 9, in a rear portion of the mounting sleeve 20. The rear wall 68 and adapter plate 50 acting as a divider also allow the electrical device to be accessed for use while minimizing contact with electrical connections within the closed electrical wiring chamber 23. A plug chamber 76 which is in front of the electrical device, as seen in FIG. 9, and formed by the cover base 60 and adapter plate 50, allows for an electrical cord to be left plugged in to the electrical device, while allowing the low profile cover lid 80 to close.

Figure 8:
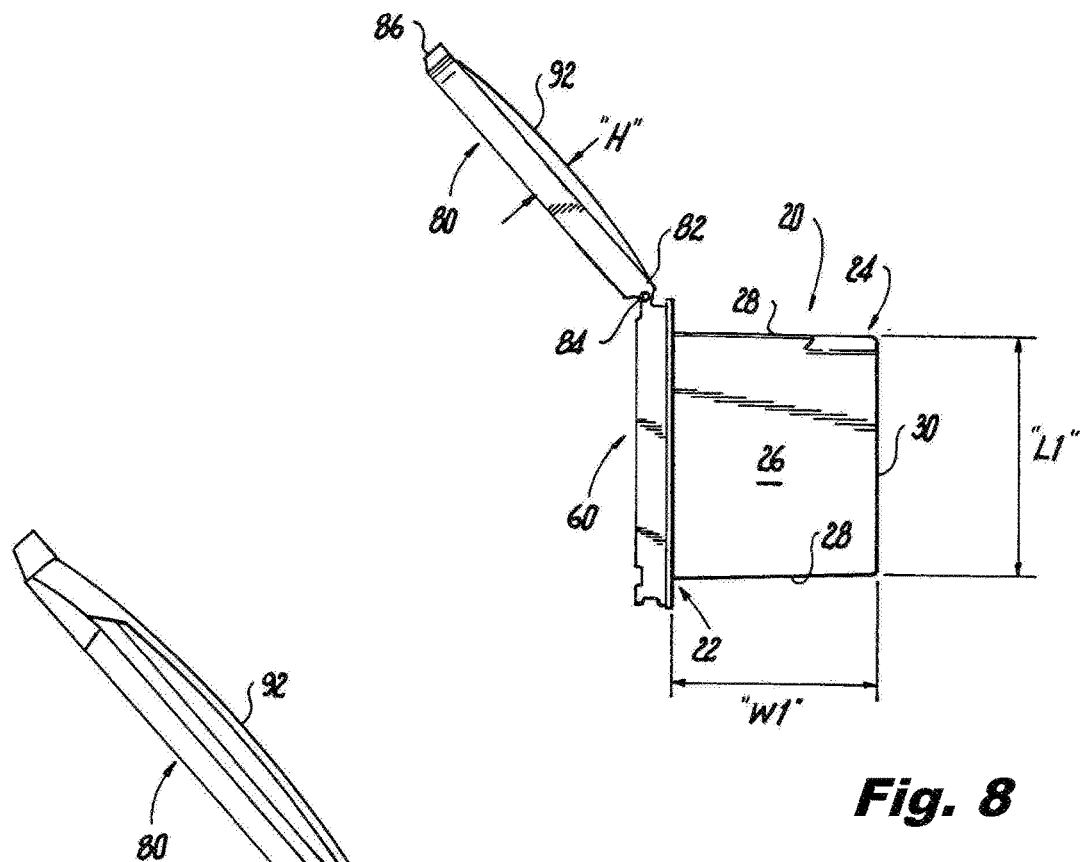
FIG. 8 is a side view of an assembled electrical box assembly similar to FIG. 1 with the cover lid in an open position.

Referring to FIGS. 1 and 7-11, the cover lid 80 is configured and dimensioned to fit over the cover base 60 and provide a weatherproof seal between the cover lid and cover base so that when properly used, weather, e.g., rain, does not enter the plug chamber 76 or the further recessed electrical wiring chamber 23. The cover lid 80 is pivotably secured to the cover base 60 via a hinge assembly. In the exemplary embodiment shown, the hinge assembly includes a plurality of hinge arms 82 that mate with hinge arms 70 on cover base 60, and a pivot pin 84 is inserted through the hinge arms to form a piano type hinge assembly. The cover lid 80 is a gravity operated cover lid, such that the hinge assembly is located along a top portion of the cover body 60, as shown in FIGS. 8 and 9, so that the cover lid 80 will pivot downwardly to a closed position by the weight of the cover lid. It should be noted that if the electrical box assembly 10 is installed within a wall in a horizontal position, then the hinge assembly would be along a top horizontal wall of the electrical box assembly so that gravity would normally cause the hinge assembly to close. In another embodiment, the hinge assembly may include a spring that normally biases the cover lid towards the closed position. Using a hinge assembly with a spring, allows the closure of the cover lid 80 even if the electrical box assembly 10 is installed within a wall in a horizontal position without having to move the hinge assembly to the horizontal wall of the electrical box assembly.

To secure the low end of the cover lid 80 to the cover base 60, the cover lid 80 has a snap latch assembly that includes a latching flange 86 that engages latching member 63 on the cover base 60. An interior surface of the cover lid 80 may include a weatherproof gasket (not shown), e.g., a rubber or foam gasket, to help provide a weatherproof seal between the flange 62 of the cover base 60 and the cover lid 80. To permit an electrical cord plugged into an electrical device installed within the mounting sleeve 20 to extend from the electrical box assembly 10, the cover lid includes a cord channel 88, seen in FIGS. 7 and 11, that allows the electrical cord to extend outside the electrical wiring box assembly 10 while allowing the cover lid to provide the weatherproof seal described above. To facilitate easy lifting of the cover lid 80, a bottom corner of the cover lid includes a lift knob 90. Preferably, the lift knob 90 is formed as part of the cord channel 88.

As noted above, the cover lid 80 is preferably a low profile cover lid that has a smaller external outward profile that is more aesthetically pleasing and less susceptible to damage. In the embodiment shown, the outer surface 92 of the cover lid 80 has a bow structure that provides additional space within the electrical plug chamber 76, as seen in FIGS. 8 and 9. The height "H" of the cover lid 80 is preferable less than or equal to about 1 inch at the apex of the bow, so that the cover lid 80 preferably provides less than or equal to about 10 square inches of additional space within the electrical plug chamber 76. The outcome is a weatherproof while-in-use electrical box assembly that has a generally flush or low profile appearance relative to the finished wall surface. While the cover lid 80 is shown as a low profile lid, the present disclosure contemplates cover lids that have a larger external outward profile.

The mounting sleeve, adapter plate, cover base and cover lid of the electrical box assembly according to the present application can be made of metal, such as galvanized steel, or a plastic material, such as injection molded thermoplastic. In other embodiments some components of the electrical box assembly, e.g., the mounting sleeve, can be made of metal, such as galvanized steel, and other components, e.g., the adapter plate, cover base and cover lid, can be made of a plastic material, such as injection molded thermoplastic. Further, the size and dimensions of the electrical box assembly according to the present disclosure are shown as corresponding to a single gang type electrical box. However, one skilled in the art would readily recognize that the electrical box assembly of the present disclosure can be configured as a multiple gang box, such as a double gang box.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical box assembly comprising:
   a mounting sleeve having a housing and a flange integrally formed into and extending along the periphery of a forward portion of the housing, wherein the mounting sleeve is capable of being secured to a wall such that the housing is within the wall and the flange contacts an exterior of the wall, and wherein the mounting sleeve is configured to support an electrical device;
   a cover base configured to be inserted into and secured to the mounting sleeve, wherein the cover base includes a rear wall having an opening and a recess around a perimeter of the opening, and wherein the rear wall includes at least one tab extending into the opening;
   an adapter plate having an outer wall portion and an inner wall portion, wherein the outer wall portion is configured to fit within the recess in the rear wall of the cover base and the inner wall portion is configured to fit at least partially within the opening in the rear wall of the cover base, and wherein the inner wall portion includes at least one notch configured to receive the at least one tab to releasably secure the adapter plate to the cover base such that when the cover base is secured to the mounting sleeve, the adapter plate and the rear wall of the cover base act as a divider within the mounting sleeve to form an electrical wiring chamber within a rear portion of the mounting sleeve and a plug chamber in a forward portion of the mounting sleeve; and
   a cover lid pivotably secured to the cover base.

2. The electrical box assembly according to claim 1, wherein the housing comprises:
   a pair of side walls extending from the flange;
   a top wall extending from the flange and attached to or integrally formed into a top portion of the pair of side walls;
   a bottom wall extending from the flange and attached to or integrally formed into a bottom portion of the pair of side walls; and
   a rear wall secured to or integrally formed into a rear portion of the pair of side walls, a rear portion of the top wall, and a rear portion of the bottom wall.

3. The electrical box assembly according to claim 2, wherein the top wall includes at least one opening for receiving an electrical cable and at least one cable clamp aligned with the at least one opening used to secure the electrical cable to the mounting sleeve.

4. The electrical box assembly according to claim 2, wherein the bottom wall includes at least one opening for receiving an electrical cable and at least one cable clamp aligned with the at least one opening used to secure the electrical cable to the mounting sleeve.

5. The electrical box assembly according to claim 1, wherein the flange comprises at least one dimple that facilitates drilling of at least one mounting hole in the flange.

6. The electrical box assembly according to claim 1, wherein the housing further comprises at least one angled channel within the housing.

7. The electrical box assembly according to claim 1, wherein the cover lid is a low profile cover lid.

8. The electrical box assembly according to claim 7, wherein the low profile cover lid has a height that is less than or equal to 1 inch.

9. The electrical box assembly according to claim 7, wherein an outer surface of the low profile cover lid has a bow structure having a height at the apex of the bow that is less than or equal to 0.25 inches.

10. An electrical box assembly comprising:
    a mounting sleeve having a housing and a flange integrally formed into and extending along the periphery of a forward portion of the housing, wherein the mounting sleeve is capable of being secured to a wall such that the housing is within the wall and the flange contacts an exterior of the wall, wherein the housing has a cavity configured to receive an electrical device, and at least one angled channel within the cavity that directs a fastener inserted into the at least one angled channel toward an exterior of the mounting sleeve to facilitate securing the mounting sleeve to the wall;
    a cover base configured to be inserted into and secured to the mounting sleeve, wherein the cover base includes a rear wall having an opening and a recess around a perimeter of the opening, and wherein the rear wall includes at least one tab extending into the opening;
    an adapter plate having an outer wall portion and an inner wall portion, wherein the outer wall portion is configured to fit within the recess in the rear wall of the cover base and the inner wall portion is configured to fit at least partially within the opening in the rear wall of the cover base, and wherein the inner wall portion includes at least one notch configured to receive the at least one tab to releasably secure the adapter plate to the cover base such that when the cover base is secured to the mounting sleeve, the adapter plate and the rear wall of the cover base act as a divider within the mounting sleeve to form an electrical wiring chamber within a rear portion of the mounting sleeve and a plug chamber in a forward portion of the mounting sleeve; and
    a cover lid pivotably secured to the cover base.

11. The electrical box assembly according to claim 10, wherein the housing comprises an integrally formed electrical box having:
    a pair of side walls extending from the flange;
    a top wall extending from the flange and integrally formed into a top portion of the pair of side walls;
    a bottom wall extending from the flange and integrally formed into a bottom portion of the pair of side walls; and
    a rear wall secured to or integrally formed into a rear portion of the pair of side walls, a rear portion of the top wall, and a rear portion of the bottom wall.

12. The electrical box assembly according to claim 11, wherein the at least one angled channel is integrally formed into at least one of the pair of side walls.

13. The electrical box assembly according to claim 11, wherein the at least one angled channel is integrally formed into at least one of the top wall and the bottom wall.

14. The electrical box assembly according to claim 11, wherein the at least one angled channel comprises two pairs of angled channels, wherein one pair of angled channels are integrally formed into one of the pair of side walls, and the other pair of angled channels is integrally formed into one of the top wall or the bottom wall.

15. The electrical box assembly according to claim 10, wherein the cover lid is a low profile cover lid.

16. The electrical box assembly according to claim 15, wherein the low profile cover lid has a height that is less than or equal to 1 inch.

17. The electrical box assembly according to claim 15, wherein an outer surface of the low profile cover lid has a bow structure having a height at the apex of the bow that is less than or equal to 0.25 inches.

18. An electrical box assembly comprising:
a mounting sleeve capable of being secured to a wall comprising:
 a pair of side walls;
 a top wall integrally formed into a top portion of the pair of side walls;
 a bottom wall integrally formed into a bottom portion of the pair of side walls;
 a rear wall integrally formed into a rear portion of the pair of side walls, a rear portion of the top wall, and a rear portion of the bottom wall; and
 a flange integrally formed into a front portion of each side wall, a front portion of the top wall and a front portion of the bottom wall;
 wherein the flange extends along the periphery of the forward portion of the pair of side walls, the forward portion of the top wall and the forward portion of the bottom wall to form an open forward portion of the mounting sleeve and wherein the flange is capable of contacting an exterior of the wall when secured to the wall;
 wherein the pair of side walls, top wall, bottom wall and rear wall form a cavity configured to receive an electrical device; and
 wherein the mounting sleeve has at least one angled channel within the cavity that directs a fastener inserted into the at least one angled channel toward an exterior of the mounting sleeve to facilitate securing the mounting sleeve to the wall;
a cover base configured to be inserted into and secured to the mounting sleeve, wherein the cover base includes a rear wall having an opening and a recess around a perimeter of the opening, and wherein the rear wall includes at least one tab extending into the opening;
an adapter plate having an outer wall portion and an inner wall portion, wherein the outer wall portion is configured to fit within the recess in the rear wall of the cover base and the inner wall portion is configured to fit at least partially within the opening in the rear wall of the cover base, and wherein the inner wall portion includes at least one notch configured to receive the at least one tab to releasably secure the adapter plate to the cover base such that when the cover base is secured to the mounting sleeve, the adapter plate and the rear wall of the cover base act as a divider within the mounting sleeve to form an electrical wiring chamber within a rear portion of the mounting sleeve and a plug chamber in a forward portion of the mounting sleeve; and
a cover lid pivotably secured to the cover base.

19. The electrical box assembly according to claim 18, wherein the at least one angled channel is integrally formed into at least one of the pair of side walls.

20. The electrical box assembly according to claim 18, wherein the at least one angled channel is integrally formed into at least one of the top wall and the bottom wall.

21. The electrical box assembly according to claim 18, wherein the at least one angled channel comprises two pairs of angled channels, wherein one pair of angled channels are integrally formed into one of the pair of side walls, and the other pair of angled channels are integrally formed into one of the top wall or the bottom wall.

22. The electrical box assembly according to claim 18, wherein the cover lid is a low profile cover lid.

23. The electrical box assembly according to claim 22, wherein the low profile cover lid has a height that is less than or equal to 1 inch.

24. The electrical box assembly according to claim 22, wherein an outer surface of the low profile cover lid has a bow structure having a height at the apex of the bow that is less than or equal to 0.25 inches.

* * * * *